United States Patent
Jahnke et al.

(10) Patent No.: US 10,680,265 B2
(45) Date of Patent: Jun. 9, 2020

(54) ENERGY STORAGE USING AN REP WITH AN ENGINE

(71) Applicant: FuelCell Energy, Inc., Danbury, CT (US)

(72) Inventors: Fred C. Jahnke, Rye, NY (US); Matthew Lambrech, Sherman, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 15/980,305

(22) Filed: May 15, 2018

(65) Prior Publication Data

US 2018/0261860 A1   Sep. 13, 2018

Related U.S. Application Data

(63) Continuation of application No. PCT/US2016/062083, filed on Nov. 15, 2016.

(60) Provisional application No. 62/255,868, filed on Nov. 16, 2015.

(51) Int. Cl.
*H01M 8/0612* (2016.01)
*H01M 8/18* (2006.01)
*H01M 16/00* (2006.01)
*C25B 15/08* (2006.01)
*C25B 1/02* (2006.01)
*C01B 3/38* (2006.01)
*C25B 1/00* (2006.01)

(52) U.S. Cl.
CPC ............ *H01M 8/0612* (2013.01); *C01B 3/38* (2013.01); *C25B 1/00* (2013.01); *C25B 1/02* (2013.01); *C25B 15/08* (2013.01); *H01M 8/184* (2013.01); *H01M 16/003* (2013.01); *C01B 2203/0233* (2013.01); *C01B 2203/067* (2013.01); *H01M 2250/407* (2013.01); *Y02E 60/366* (2013.01); *Y02E 60/528* (2013.01); *Y02E 60/566* (2013.01)

(58) Field of Classification Search
CPC .. H01M 8/0612; H01M 8/184; H01M 16/003; H01M 2250/407; H01M 8/06; C01B 3/38; C01B 2203/0233; C01B 2203/067; C25B 1/00; C25B 1/02; C25B 15/08; Y02E 60/528; Y02E 60/466; Y02E 60/566
USPC ........................................................ 429/423
See application file for complete search history.

(56) References Cited

U.S. PATENT DOCUMENTS

| | | |
|---|---|---|
| 3,094,390 A | 6/1963 | Vander |
| 4,849,091 A | 7/1989 | Cabrera et al. |
| 5,071,719 A | 12/1991 | Rostrup-Nielsen et al. |
| 5,346,613 A | 9/1994 | Lomas et al. |
| 5,413,878 A | 5/1995 | Williams et al. |
| 5,711,770 A | 1/1998 | Malina |
| 6,187,465 B1 | 2/2001 | Galloway |
| 7,070,874 B2 | 7/2006 | Blanchet et al. |
| 7,323,270 B2 | 1/2008 | Patel et al. |
| 7,353,085 B2 | 4/2008 | Rusta-Sallehy et al. |
| 7,396,603 B2 | 7/2008 | Farooque et al. |
| 9,478,819 B2 | 10/2016 | Lambrech et al. |
| 2002/0004154 A1 | 1/2002 | Pastula et al. |
| 2004/0180249 A1 | 9/2004 | Pham et al. |
| 2004/0202914 A1 | 10/2004 | Sridhar et al. |
| 2005/0058863 A1 | 3/2005 | Wang et al. |
| 2005/0112425 A1 | 5/2005 | Hsu |
| 2005/0123810 A1 | 6/2005 | Balan |
| 2005/0197743 A1 | 9/2005 | Rusta-Sallehy et al. |
| 2005/0271914 A1 | 12/2005 | Farooque et al. |
| 2006/0140823 A1 | 6/2006 | Katikaneni et al. |
| 2006/0248800 A1 | 11/2006 | Miglin et al. |
| 2008/0060935 A1 | 3/2008 | Hartvigsen |
| 2008/0075990 A1 | 3/2008 | Isozaki et al. |
| 2008/0155984 A1 | 7/2008 | Liu et al. |
| 2008/0314741 A1 | 12/2008 | Balestrino et al. |
| 2009/0110989 A1 | 4/2009 | Daly et al. |
| 2009/0158662 A1 | 6/2009 | Towler |

(Continued)

FOREIGN PATENT DOCUMENTS

| | | |
|---|---|---|
| CA | 1242985 A | 8/1985 |
| CA | 2937948 A | 8/2015 |

(Continued)

OTHER PUBLICATIONS

International Search Report and Written Opinion on PCT/US16/62083, dated Jan. 31, 2017, 8 pages.
Caprile et al.; Carbon capture: Energy wasting technologies or the MCFCs challenge? International Journal of Hydrogen Energy; 2011 ;36:10269-77.
Desideri et al.; MCFC-based CO2 capture system for small scale CHP plants. International Journal of Hydrogen Energy. 2012;37: 19295-303.

(Continued)

*Primary Examiner* — Anca Eoff
(74) *Attorney, Agent, or Firm* — Foley & Lardner LLP (57) ABSTRACT

An energy storage system includes a power plant configured to generate an exhaust gas comprising carbon dioxide. The energy storage system further includes a first fuel cell configured to operate in reverse as an electrolyzer. The first fuel cell is configured to receive at least a portion of the exhaust gas from the power plant. An anode is configured to receive carbon dioxide via the exhaust gas and methane from a separate feed, and the anode is configured to output a hydrogen-containing gas mixture. The energy storage system further includes a reformer configured to methanate the hydrogen-containing gas mixture to convert substantially all of the carbon monoxide in the hydrogen-containing gas mixture to methane. The energy storage system further includes a second fuel cell operating in reverse as a hydrogen pump, the second fuel cell configured to separate hydrogen from a gas mixture output by the reformer.

18 Claims, 5 Drawing Sheets

(56) References Cited

U.S. PATENT DOCUMENTS

| | | | |
|---|---|---|---|
| 2009/0226775 A1 | 9/2009 | Jahnke et al. | |
| 2009/0235587 A1 | 9/2009 | Hawkes et al. | |
| 2010/0047641 A1* | 2/2010 | Jahnke | H01M 8/04291 429/415 |
| 2010/0304228 A1 | 12/2010 | Majarov et al. | |
| 2011/0104577 A1 | 5/2011 | Cui et al. | |
| 2011/0189567 A1 | 8/2011 | Venkataraman et al. | |
| 2013/0052548 A1* | 2/2013 | Nedergaard Clausen | H01M 8/04238 429/410 |
| 2013/0108936 A1 | 5/2013 | McElroy et al. | |
| 2013/0126038 A1 | 5/2013 | Jamal et al. | |
| 2013/0177824 A1 | 7/2013 | Cui et al. | |
| 2013/0251598 A1 | 9/2013 | Gil et al. | |
| 2013/0260268 A1 | 10/2013 | Shapiro et al. | |
| 2014/0076213 A1 | 3/2014 | Ingram et al. | |
| 2014/0080076 A1 | 3/2014 | Lutz | |
| 2014/0093798 A1 | 4/2014 | Snyder et al. | |
| 2014/0272626 A1 | 9/2014 | Berlowitz et al. | |
| 2014/0272629 A1 | 9/2014 | Berlowitz et al. | |
| 2015/0280265 A1 | 10/2015 | Mclarty | |
| 2016/0344045 A1 | 11/2016 | Ishino et al. | |
| 2016/0351930 A1 | 12/2016 | Jahnke et al. | |

FOREIGN PATENT DOCUMENTS

| | | |
|---|---|---|
| CN | 101427408 A | 5/2009 |
| CN | 104847424 A | 8/2015 |
| CN | 106133973 A | 11/2016 |
| DE | 10 2012 206 541 A1 | 10/2013 |
| EP | 2 784 187 A1 | 10/2014 |
| EP | 3 054 519 A1 | 8/2016 |
| JP | 51-008405 A | 1/1976 |
| JP | 60-235893 | 11/1985 |
| JP | 06-005301 A | 1/1994 |
| JP | 11-169661 A | 6/1999 |
| JP | 11-223475 A | 8/1999 |
| JP | 2002-319428 | 10/2002 |
| JP | 2004-099927 A | 4/2004 |
| JP | 2004-311159 A | 11/2004 |
| JP | 2007-162531 | 6/2007 |
| JP | 2007-523443 | 8/2007 |
| JP | 2008-507113 | 3/2008 |
| JP | 2009-517547 | 4/2009 |
| JP | 2010-013333 A | 1/2010 |
| JP | 2010-518559 A | 5/2010 |
| JP | 2010-129286 | 6/2010 |
| JP | 2010-212141 A | 9/2010 |
| JP | 2010-228963 | 10/2010 |
| JP | 2012-514039 | 6/2012 |
| JP | 2014-198789 | 10/2014 |
| JP | 2005-293934 A | 10/2015 |
| JP | 6096790 B2 | 3/2017 |
| JP | 2017-511956 | 4/2017 |
| KR | 1020070057131 A | 6/2007 |
| KR | 20110114816 | 10/2011 |
| KR | 1020160114632 A | 10/2016 |
| WO | WO-01/04045 | 1/2001 |
| WO | WO-2007/015689 A2 | 2/2007 |
| WO | WO-2009/031747 A1 | 3/2009 |
| WO | WO-2013/029701 A1 | 3/2013 |
| WO | WO-2015/116964 A1 | 8/2015 |
| WO | WO-2017/087405 A1 | 5/2017 |

OTHER PUBLICATIONS

Extended European Search Report dated Oct. 26, 2018 for EP18182210.7 (8 pages).
Extended European Search Report in EP 15744017.3 dated Aug. 16, 2017 (12 pages).
Extended European Search Report received in EP18182124.0 dated Dec. 7, 2018 (6 pages).
Heidenbrecht et al., 'Molten Carbonate Fuel Cell (MCFC) with Internal Reforming: model-based analysis of cell dynamics, Chemical Engineering Science, vol. 58, issues 3-6, 2003, pp. 1029-1036.
International Search Report and Written Opinion dated May 6, 2014 in PCT/US2015/013837 (13 pages).
International Search Report and Written Opinion dated Jul. 19, 2017 for PCT/US17/28321 (16 pages).
International Search Report and Written Opinion dated Jul. 26, 2017 in PCT/US17/30230 (13 pages).
International Search Report and Written Opinion for PCT/US16/61981 dated Jan. 19, 2017 (8 pages).
International Search Report and Written Opinion in PCT/US/16/62276, dated Jan. 31, 2017 (8 pages).
International Search Report and Written Opinion in PCT/US16/62069 dated Jan. 27, 2017 (10 pages).
Kasai, "CO2 Electrochemical Separation by Molten Carbonate Technology," Fuel Chemistry Division Preprints, 2002, 47(1), 69-70.
Non-Final Office Action on U.S. Appl. No. 15/115,186 dated Dec. 31, 2018 (7 pages).
Notice of Preliminary Rejection for KR Appl. No. 10-2018-7017810 dated Nov. 12, 2018, with English translation (13 pages).
Notification of the First Office Action for CN201580009634.6 dated May 4, 2018, with English translation (15 pages).
Office Action received in KR 10-2018-7016036 dated Nov. 12, 2018, with English translation (13 pages).
Office Action received in JP 2016-549225, dated Sep. 25, 2017, with English translation (9 pages).
Office Action received in JP 2018-133361 dated Dec. 10, 2018, with English translation (8 pages).
Office Action received in JP 2018-133362 dated Dec. 7, 2018, with English translation (6 pages).
Office Action received in JP 2018-525359 dated Dec. 10, 2018, no English translation available (4 pages ).
Second Office Action received in CA2937948 dated Jun. 11, 2018 (4 pages).
International Search Report and Written Opinion in PCT/IB2018/058968 dated Jan. 23, 2019 (16 pages).
First Examination Report in IN201627029189 dated Mar. 28, 2019 (7 pages).
International Search Report and Written Opinion in PCT/IB2018/059191 dated Mar. 27, 2019 (20 pages).
Office Action in JP2018-116336 dated Mar. 26, 2019.
Office Action in JP2018-525366 dated Apr. 9, 2019.
Second Office Action in JP2018-525361 dated Mar. 26, 2019.
Office Action in JP2018-525557 dated May 24, 2019, with English translation (14 pages).
Extended European Search Report in EP16866931 dated May 2, 2019 (10 pages).
Extended European Search Report in EP16867038.8 dated Jun. 27, 2019 (8 pages).
Extended European Search Report on EP16866959.6 dated May 3, 2019 (10 pages).
Extended European Search Report received in EP16866965.3, dated Jun. 17, 2019 (7 pages).
Manuel, B. et al., Power to Gas-biomass oxycombustion hybrid system: Energy integration and potential applications, Applied Energy, Elsevier Science Publishers, GB, vol. 167, Oct. 16, 2015, pp. 221-229.
Non-Final Office Action on U.S. Appl. No. 15/815,556 dated Oct. 28, 2019.
Notice of Allowance on U.S. Appl. No. 15/980,356 dated Sep. 24, 2019.
Third Office Action in JP 2018-116336 dated Dec. 20, 2019 (9 pages).

* cited by examiner

ENERGY STORAGE USING AN REP WITH AN ENGINE

CROSS-REFERENCE TO RELATED PATENT APPLICATIONS

The present application is a Continuation of International Application No. PCT/US2016/062083, filed Nov. 15, 2016, which claims the benefit of and priority to U.S. Provisional Patent Application No. 62/255,868, filed Nov. 16, 2015. The entire disclosures of International Application No. PCT/US2016/062083 and U.S. Provisional Patent Application No. 62/255,868 are incorporated herein by reference.

STATEMENT OF GOVERNMENT RIGHTS

This invention was made with Government support under Cooperative Agreement DE-EE0006669 awarded by the United States Department of Energy. The Government has certain rights in the invention.

BACKGROUND

The present application relates generally to the field of energy storage using fuel cells.

Energy storage may be performed by generating $H_2$ From water or hydrocarbons. A reformer-electrolyzer-purifier ("REP") may be used to generate $H_2$. Examples of REPs and systems that include them are described in PCT Publication No. WO 2015/116964, which is assigned to the assignee of the present application.

REPs require steam and $CO_2$ to operate. Such steam and $CO_2$ may be supplied by a high-temperature fuel cell. However, access to a high-temperature fuel cell is sometimes limited (e.g. due to cost or scale of power generated).

SUMMARY

In one embodiment, an energy storage system includes a power plant, configured to generate an exhaust gas comprising carbon dioxide. The energy storage system further includes a first fuel cell comprising an anode and a cathode separated by an electrolyte matrix, and a power supply configured to apply a reverse voltage to the first fuel cell to operate the first fuel cell in reverse as an electrolyzer. The first fuel cell is configured to receive at least a portion of the exhaust gas from the power plant. The anode is configured to receive carbon dioxide via the exhaust gas and to also receive methane from a separate feed. The anode is configured to output a hydrogen-containing gas mixture comprising hydrogen and carbon monoxide. The energy storage system further includes a reformer configured to methanate the hydrogen-containing gas mixture output from the anode of the first fuel cell to convert substantially all of the carbon monoxide in the hydrogen-containing gas mixture to methane, wherein the reformer is configured to output a gas mixture. The energy storage system further includes a second fuel cell operating in reverse as a hydrogen pump, the second fuel cell configured to separate hydrogen from the gas mixture output by the reformer.

In one aspect of the energy storage system, the cathode of the first fuel cell is configured to receive the exhaust gas from the power plant.

In one aspect of the energy storage system, the power plant is an internal combustion engine.

In one aspect of the energy storage system, the feed is configured to supply methane to the anode of the first fuel cell separate from the exhaust gas of the power plant.

In one aspect of the energy storage system, the feed comprises methane and carbon dioxide. An amount of hydrogen output by the second fuel cell is proportional to an amount of carbon supplied by the feed.

In one aspect of the energy storage system, the cathode of the first fuel cell is configured to receive a gas mixture output from an anode of the second fuel cell.

In one aspect of the energy storage system, the reformer is further configured to convert carbon dioxide that is included in the hydrogen-containing gas output by the first fuel cell to methane.

In one aspect of the energy storage system, the second fuel cell is configured to compress hydrogen-containing gas using an electrochemical hydrogen compressor to output purified hydrogen gas.

In another embodiment, a method of generating hydrogen using the energy storage system includes supplying a fuel to the power plant and generating the exhaust gas using the power plant, and receiving, at the first fuel cell, steam and the exhaust gas from the power plant. The method further includes receiving, at the anode of the first fuel cell, carbon dioxide via the exhaust gas, and methane from the separate feed. The method further includes outputting, from the first fuel cell, the hydrogen-containing gas mixture comprising hydrogen and carbon monoxide. The method further includes converting, using the reformer, substantially all of the carbon monoxide received from the first fuel cell into methane. The method further includes separating, using the second fuel cell, hydrogen from the gas mixture output from the reformer. The method further includes feeding the remaining gas mixture from the second fuel cell into the cathode of the first fuel cell.

In one aspect of the energy storage system, the method further includes generating hydrogen-containing gas in the anode of the first fuel cell when the power supply applies reverse voltage to the first fuel cell, and separating, using an electrolysis reaction in the anode of the first fuel cell, carbon dioxide from the hydrogen-containing gas.

In one aspect of the method, the first fuel cell outputs the hydrogen-containing gas and separately outputs an oxidant gas comprising carbon dioxide and oxygen.

In one aspect of the energy storage system, the method further includes compressing, using at least an electrochemical hydrogen compressor in the second fuel cell, hydrogen-containing gas from the anode of the first fuel cell.

In one aspect of the energy storage system, the method further includes outputting purified hydrogen gas from the cathode of the second fuel cell.

In one aspect of the method, the remaining gas mixture from the second fuel cell is output from the anode of the second fuel cell.

In one aspect of the energy storage system, the method further includes feeding heat from the exhaust gas only to the cathode of the first fuel cell when no power needs to be stored in the energy storage system, such that the heat maintains the first fuel cell at a desired operating temperature.

In another embodiment, an energy storage system includes a power plant configured to output an REP cathode feed gas and a fuel cell including an anode and a cathode separated by an electrolyte matrix. The fuel cell further includes a power supply configured to apply a reverse voltage to the first fuel cell to operate the fuel cell in reverse as an electrolyzer. The anode is configured to receive an REP anode feed gas comprising carbon dioxide. The fuel cell is configured to output a hydrogen-containing gas mixture comprising hydrogen and carbon dioxide. The energy storage system further includes a reformer configured to methanate the hydrogen-containing gas mixture output from the fuel cell, such that carbon dioxide is converted to methane, the reformer configured to output a converted hydrogen-containing gas mixture. The energy storage system further includes a compressor configured to compress the converted hydrogen-containing gas mixture from the reformer.

In one aspect of the energy storage system, the REP anode feed gas further comprises a hydrocarbon.

In one aspect of the energy storage system, the power plant is an internal combustion engine.

In one aspect of the energy storage system, the REP cathode feed gas is exhaust gas from the power plant.

In one aspect of the energy storage system, the reformer is configured to convert carbon monoxide and carbon dioxide in the hydrogen-containing gas mixture output by the fuel cell into methane.

In one aspect of the energy storage system, the compressor is configured to compress methane in the converted hydrogen-containing gas mixture from the reformer.

In one aspect of the energy storage system, compressed methane and the converted hydrogen-containing gas mixture from the compressor are cooled, such that water is condensed and separated from the converted hydrogen-containing gas mixture.

In one aspect of the energy storage system, methane produced in the energy storage system is configured to be inserted into a pipeline.

In one aspect of the energy storage system, the energy storage system further includes a water knockout pot configured to remove condensed water from the methane output stream.

In one aspect of the energy storage system, compressed methane output from the compressor is configured to be stored.

In one aspect of the energy storage system, the power plant is configured to receive an anaerobic digester gas and a mixture of carbon dioxide and methane.

In another embodiment, a method of generating hydrogen using the energy storage system includes receiving, at the anode of the fuel cell, carbon dioxide via the anode REP feed gas. The method further includes outputting, from the fuel cell, the hydrogen-containing gas mixture comprising methane, carbon dioxide, and hydrogen. The method further includes methanating, using the reformer, the hydrogen-containing gas mixture from the fuel cell. The method further includes separating, using the compressor, water from the converted hydrogen-containing gas mixture from the reformer, and outputting a separated gas mixture from the compressor.

In one aspect of the energy storage system, the method further includes removing, in a water knockout pot, water from the separated gas mixture output by the compressor, and feeding into a gas pipeline methane from the separated gas mixture output by the compressor.

In one aspect of the energy storage system, the method further includes generating hydrogen-containing gas in the anode of the first fuel cell when the power supply applies reverse voltage to the fuel cell, and separating, using an electrolysis reaction in the anode of the fuel cell, carbon dioxide from the hydrogen-containing gas mixture.

In one aspect of the method, the fuel cell outputs the hydrogen-containing gas mixture and separately outputs an oxidant gas comprising carbon dioxide and oxygen.

DETAILED DESCRIPTION

A reformer-electrolyzer-purifier ("REP") assembly includes at least one electrolyzer molten carbonate fuel cell and may include a plurality of electrolyzer fuel cells formed in a fuel cell stack, also referred to as a REP stack. The at least one electrolyzer fuel cell is a fuel cell operated in reverse so as to electrolyze $CO_2$ and water to produce hydrogen, and to purify the hydrogen by removing the $CO_3^=$ electrochemically. The $CO_2$ may be provided by a hydrocarbon, such as methane, and removing the $CO_3^=$ drives the reforming reaction to completion. Other reactions may occur in the at least one electrolyzer fuel cell, as described below and shown in the accompanying Figures.

The REP stack comprises a molten carbonate fuel cell ("MCFC") stack and the REP assembly includes a power supply for supplying power to the REP stack for driving the electrolysis reactions to completion. A controller may be included in the REP assembly and/or in the REP system for controlling the power supply and for controlling other operations and parts of the REP assembly and/or REP system. Control operations are described in more detail below. Although the specification describes the REP assembly, the REP stack and the REP system as including reforming, such as internal or external reforming, it is also contemplated that the REP assembly, the REP stack and/or the REP system may omit internal and/or external reforming, and may be used for electrolyzing a supply gas containing $CO_2$ and water and purifying hydrogen without reforming.

Figure 1:
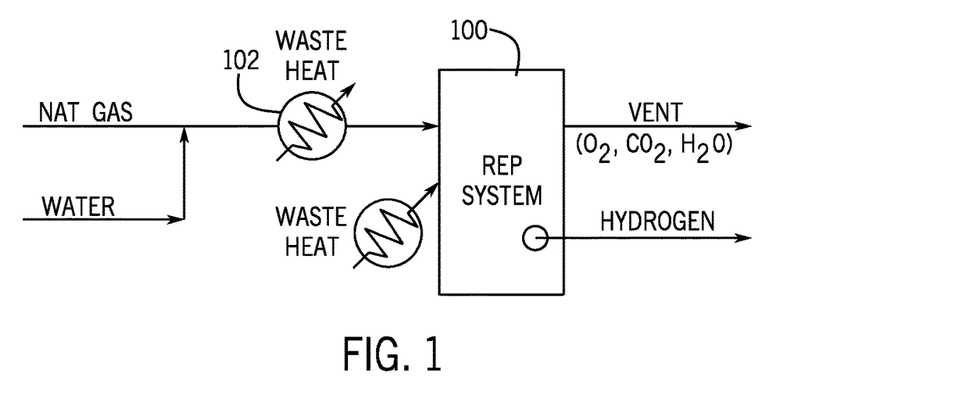
FIG. 1 shows a schematic view of the reformer-electrolyzer-purifier (REP) system including a REP assembly of the present invention.

FIG. 1 shows a schematic view of an example of a REP system 100. As shown in FIG. 1, fuel, such as natural gas, anaerobic digester gas ("ADG"), or other suitable fuel, is pre-heated using lower level waste heat in a pre-heater 102 and thereafter supplied to the REP system 100. The fuel may be humidified or mixed with water before or after being pre-heated. In the REP system 100, the fuel is reformed by reacting with steam to produce hydrogen, CO, and carbon dioxide, and hydrogen is purified at high temperature (reforming temperatures) by removing $CO_2$ from the $H_2$ to separate it from other reaction products and drive the reforming reaction to completion. The REP system 100 outputs hydrogen and separately outputs other reaction products, including oxygen, and carbon dioxide. As shown, high level waste heat is supplied to the REP system 100 to drive the endothermic reforming reaction so that all of the fuel is converted to hydrogen, thereby reducing $CO_2$ emissions resulting from incomplete conversion of methane to hydrogen.

A REP assembly may be used in combination with a base load direct fuel cell ("DFC"®) or solid oxide fuel cell ("SOFC") in order to store excess power from the grid with a high round trip efficiency. Generally, in order to balance net generation of power with demand, power supply systems, such as power grids, need to store excess power during periods of high power generation from renewable generators and return it to the grid during periods of low power generation from the renewable sources which cannot be dispatched. Conventional solutions for storage of excess power have been to use batteries, low efficiency electrolyzers, compressed air energy storage, and pumped hydroelectric systems, all of which are expensive, have limited storage capacity or have high round trip energy losses.

Figure 2:
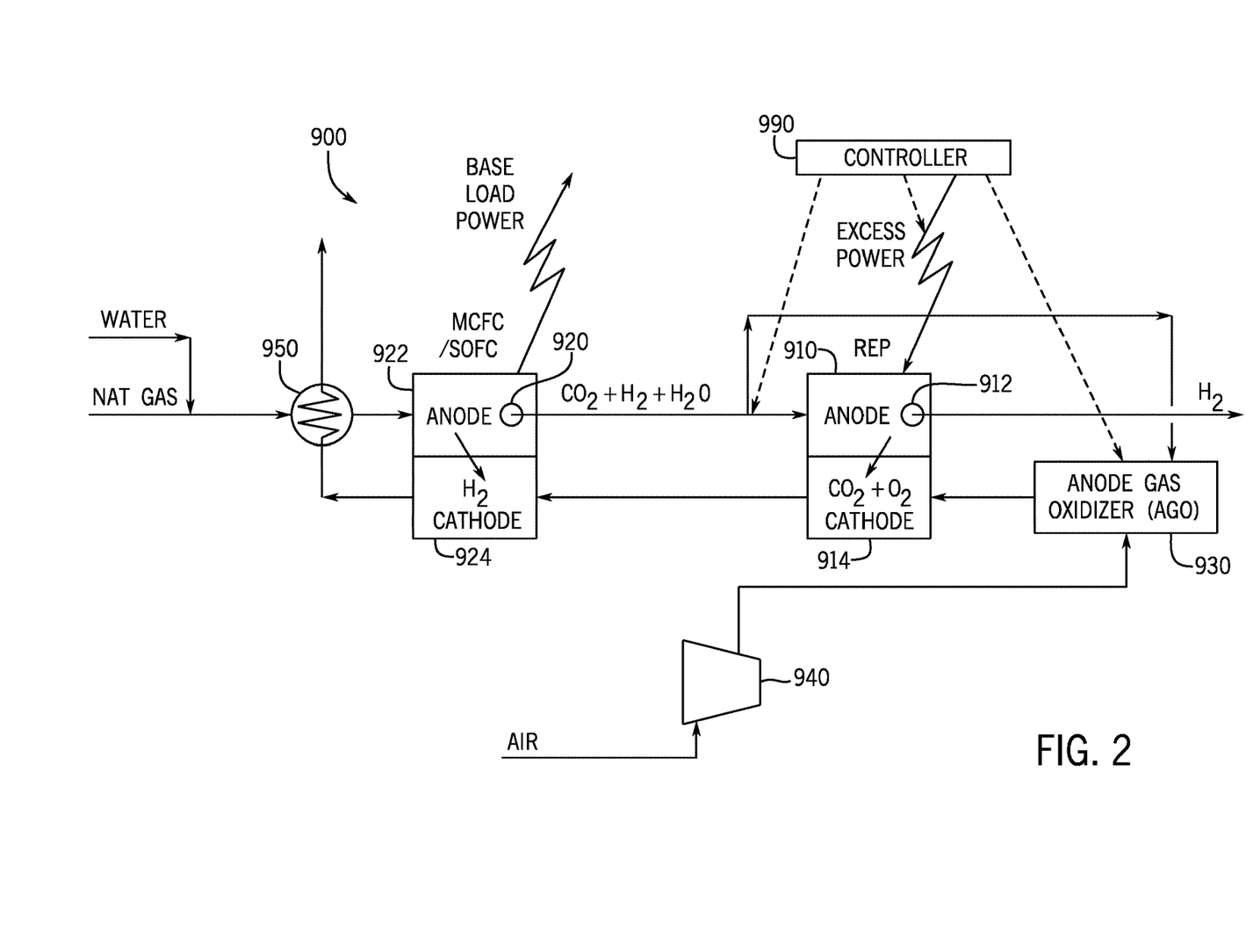
FIG. 2 shows an illustrative configuration of an energy storage system that incorporates a REP assembly.

In one example of an energy storage system, described in PCT Publication No. WO 2015/116964, high round trip efficiency for storing excess power from the grid is provided by combining a DFC or SOFC operated to provide baseload power with the REP assembly that consumes excess power to generate hydrogen output. For example, FIG. 2 shows an illustrative configuration of such an energy storage system 900. In FIG. 2, the system 900 comprises a REP assembly 910 with an anode side 912 and a cathode side 914 separated by an electrolyte matrix, a DFC 920 with an anode side 922 and a cathode side 924 separated by a matrix, and an anode exhaust gas oxidizer ("AGO") 930. The DFC 920 may be any fuel cell using a hydrocarbon feed such as a SOFC or a molten carbonate fuel cell ("MCFC").

As shown in FIG. 2, fuel, such as natural gas, and water are supplied to the system 900 and preheated in a heat exchanger 950 so as to vaporize the water to produce steam. The fuel and steam mixture is then supplied to the anode side 922 of the DFC 920 where the fuel is internally reformed using a direct reforming catalyst and undergoes an electrochemical reaction with an oxidant gas supplied to the cathode side 924 of the DFC 920 to produce base load power. Base load power (DC power) is output from the DFC 920 and may be provided to the grid or for powering external devices. Anode exhaust comprising $CO_2$, $H_2$, CO, and water is output from the anode side 922 of the DFC and provided to the anode side 912 of the REP assembly 910 and/or to the AGO 930.

In FIG. 2, the anode side of the REP assembly 910 receives all or a portion of the anode exhaust output from the anode side 922 of the DFC. Although not shown in FIG. 2, steam may be added to the anode exhaust output from the anode side 922 of the DFC before the anode exhaust is supplied to the REP assembly 910. This is because heat and material balances around the system show that the anode exhaust from the DFC is slightly deficient in water content for high purity hydrogen production. The REP assembly 910 reacts the CO and $CO_2$ in the anode exhaust gas with water to produce hydrogen. The hydrogen in the anode exhaust gas REP feed is added to the hydrogen generated from the reactions in the REP assembly. Typically, anode exhaust contains 20-30% $H_2$+CO on a dry basis and the CO is converted to hydrogen during an internal water gas shift reaction in the REP assembly 910. Water and $CO_2$ in the anode exhaust are also electrochemically reacted to produce $H_2$ and $CO_3^=$ ions, and the $CO_3^=$ ions are conveyed through the electrolyte membrane, converted to $CO_2$ and $O_2$ in the cathode side 914 and thereafter output from the cathode side 914 of the REP assembly as the oxidant gas. These reactions that occur in the REP assembly during its operation on anode exhaust from the DFC are shown in detail in FIG. 3.

Figure 3:
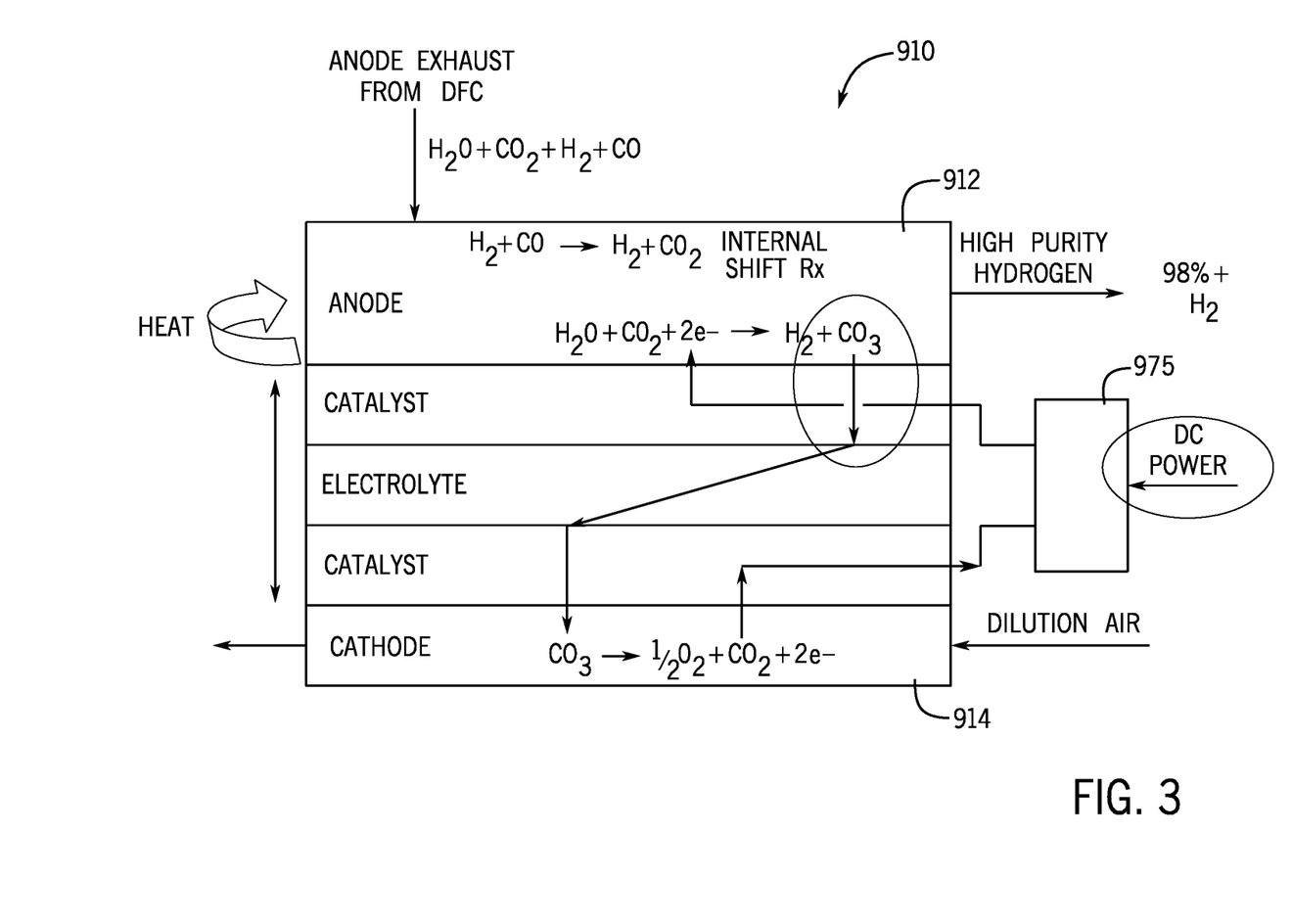
FIG. 3 shows a schematic configuration of the REP assembly and the reactions that occur therein.

As can be seen in FIG. 3, DC power is provided to the REP assembly from a power supply 975 to apply a reverse voltage to the at least one electrolyzer fuel cell of the REP assembly. Since the anode exhaust already contains hydrogen, the power consumption per kilogram of hydrogen output from the REP assembly 900, including the hydrogen input with the anode exhaust, is about 75% of the typical 35 kWh/kg power consumption for high-temperature electrolyzers, or about 26 kWh/kg. Since the power consumption per kilogram of hydrogen output by the REP assembly 900 is reduced, the round-trip efficiency for storing power is roughly doubled when compared to standard low temperature electrolyzers, which may require approximately between 45-60 kWh/kg $H_2$.

Referring again in FIG. 2, air is supplied to the AGO 930 using a blower 940 or a similar device. The AGO 930 also receives a portion of the anode exhaust from the anode side 922 of the DFC 920 and can also receive a portion of the hydrogen-containing gas generated in the REP assembly and output from the anode side 912 of the REP assembly 900. This allows the AGO temperature to be controlled independent of the REP operation. The AGO 930 oxidizes the fuel in the DFC anode exhaust and/or the hydrogen-containing gas to produce and output heated oxidant gas, which is conveyed to the cathode side 914 of the REP assembly 910. The supply of heated oxidant gas to the REP assembly 900 reduces the power requirements of the REP assembly, thus increasing its efficiency. As shown in FIG. 2, the oxidant gas comprising the $CO_2$ and $O_2$ mixture produced in the REP assembly 900 is conveyed from the cathode side 914 of the REP assembly 900 to the cathode side 924 of the DFC 920. Cathode exhaust output from the cathode side 924 of the DFC 920 is sent to the heat exchanger 950 for preheating the fuel and water mixture input into the system 900 before being vented out of the system.

In FIG. 2, a controller 990 is used to control the operation of the system 900, including controlling distribution of the anode exhaust from the DFC 920, controlling distribution of the hydrogen-containing gas output from the anode side of the REP assembly 910 and providing excess power to the REP assembly 910 depending on the external power demands and the availability of excess power. Specifically, the DFC is operated to generate base load power which is used for external power demands, e.g. the grid, and all or a portion of the anode exhaust from the DFC 910 is output directly to the REP assembly 910. When there is no excess power on the grid to be stored, the DFC anode exhaust may be conveyed through the REP assembly 910 and is output from the anode side 912 of the REP assembly 910 unchanged, e.g., the hydrogen-containing gas is unchanged anode exhaust. In this way, the REP assembly 910 is kept hot and ready to operate on demand whenever excess power appears on the grid. In such cases, the controller 990 controls the hydrogen-containing gas from the REP assembly 910 to be conveyed to the AGO 930, which also receives air and burns or oxidizes the anode exhaust to produce hot oxidant gas containing $N_2$, $O_2$ and $CO_2$. This hot oxidant gas is then conveyed to the cathode side 914 of the REP assembly 910, and oxidant gas output from the cathode side 914 of the REP assembly 910 is then conveyed to the DFC cathode side 924. Conveying the hot oxidant gas through the REP assembly helps to keep the REP assembly 910 hot regardless of whether the REP assembly is operating on excess power or is idle.

When excess power is available and needs to be stored, the controller 990 controls to provide the excess power to the REP assembly 910 so that a reverse voltage is applied by the power supply to the at least one electrolyzer fuel cell and the DFC anode exhaust supplied to the REP assembly 910 is converted to hydrogen. In this case, the controller 990 controls the amount of DFC anode exhaust bypassed around the REP assembly 910 based on the amount of excess power available and provided to the REP assembly. Through such control, the portion of the DFC anode exhaust fed to the REP assembly 910 balances the excess power provided to the REP assembly to produce high purity (>97%) hydrogen gas.

The controller 990 also controls the amount of hydrogen-containing gas output from the REP assembly provided to the AGO 930 and the amount of hydrogen-containing gas output for external uses, e.g., exported, as shown in FIG. 2, based on whether the REP assembly 910 is operating on excess power or is idle and based on the amount of heat needed to be generated in the AGO 930, e.g., temperature of the AGO. For example, when the REP assembly 910 is operating on excess power and the amount of DFC anode exhaust bypassed around the REP assembly and provided to the AGO is insufficient for maintaining the AGO temperature at the predetermined temperature, the controller 990 controls to provide a portion of the hydrogen-containing gas output from the REP assembly to the AGO so as to maintain the predetermined temperature in the AGO. The controller 990 further controls to increase the amount of hydrogen-containing gas from the REP assembly supplied to the AGO as the amount of excess power provided to the REP assembly increases and the amount of DFC anode exhaust bypassed around the REP assembly to the AGO decreases. In contrast, when the REP assembly 910 is idle, all of the DFC anode exhaust may be provided to the REP assembly 910 to keep the REP assembly hot and, the controller 990 controls so that all or a large portion of the hydrogen-containing gas output from the anode side 912 of the REP assembly is conveyed to the AGO 930 so as to maintain the predetermined temperature in the AGO. Air to the AGO is also adjusted for temperature control.

By combining the DFC with the REP assembly and using excess power in the REP assembly for hydrogen production, the excess power is stored in the form of hydrogen produced with high power storage round trip efficiency. In the configuration of FIG. 2, the power storage round trip efficiency is estimated as follows:

Power Stored
   Hydrogen production—26 kWh/kg
   Hydrogen storage—3 kWh/kg
Power Produced
   Power production at 55% efficiency—18.5 kWh/kg
Round-Trip Efficiency=18.5/(26+3)=64% (or 71% without high pressure storage)

Although the 64% or 71% round trip efficiency of the system in FIG. 2 is similar to the 70-80% round trip efficiency achievable with conventional battery storage, the system of FIG. 2 has the advantage of producing hydrogen which can be stored in large volumes over long periods of time with no loss in efficiency. Moreover, the hydrogen produced by the system of FIG. 2 can be exported to provide fuel to devices operating on hydrogen such as off-site PEM fuel cells and fuel cell vehicles or to provide hydrogen to chemical and refining operations. Exporting the hydrogen, as in the system of FIG. 2, typically provides a higher value than converting the hydrogen back into power.

Although the illustrative system shown in FIG. 2 uses the REP assembly 910 for generating hydrogen using excess power, it is contemplated that in addition to producing hydrogen for energy storage, the REP assembly could also be operated in a power-producing mode to generate additional power to increase the efficiency of the system 900. The system of FIG. 2 may be modified so that the REP assembly 910 is controlled to operate as a high temperature electrolyzer in a hydrogen-producing mode when excess power is available for storage or in a power-producing mode to generate additional power during high power demands. In such configurations, the controller 990 controls the operation mode of the REP assembly based on the external power demand and/or availability of excess power for storage. The system of FIG. 2 may be further modified so as to include two or more topping DFCs and at least one bottoming REP assembly comprising a fuel cell stack or a DFC stack, wherein anode exhaust from the topping DFCs is supplied to an anode side of the bottoming REP assembly, preheated air and/or hot oxidant gas produced in the AGO is supplied to a cathode side of the bottoming REP assembly and cathode exhaust (oxidant gas) output from the bottoming REP assembly is supplied to respective cathode sides of the topping DFCs. An illustrative embodiment of such a system is shown in FIG. 2 of U.S. patent application Ser. No. 14/578,077, which is assigned to the assignee of the present application and incorporated herein by reference.

In such systems, which include load following with a high temperature fuel cell such as the REP or DFC, the system must be close to thermally neutral in order to avoid heating and cooling parts of the bottoming REP stack since thermal cycling greatly reduces the stack life. The thermal balance can be adjusted by adding supplemental methane fuel to the anode exhaust of the topping DFCs so that the reforming of the methane fuel in the bottoming REP assembly operating in the power producing mode absorbs heat generated from cell resistance and the current density. The controller controls the supply of the supplemental methane fuel at a rate, which is based on the current density. In some illustrative embodiments, methane concentration in the anode exhaust output from the topping DFCs may be increased, prior to supplying the anode exhaust to the bottoming REP assembly operating in the power producing mode, by cooling a portion of the anode exhaust gas of the topping DFCs and using a catalyst to convert hydrogen and $CO_2$ in the anode exhaust to methane by the following reaction:

$$4H_2 + CO_2 \rightarrow CH_4 + 2H_2O \qquad (1)$$

Moreover, when the bottoming REP assembly operates in the power producing mode, the current density may be limited by the heat generated in the cells of the REP assembly.

Figure 4:
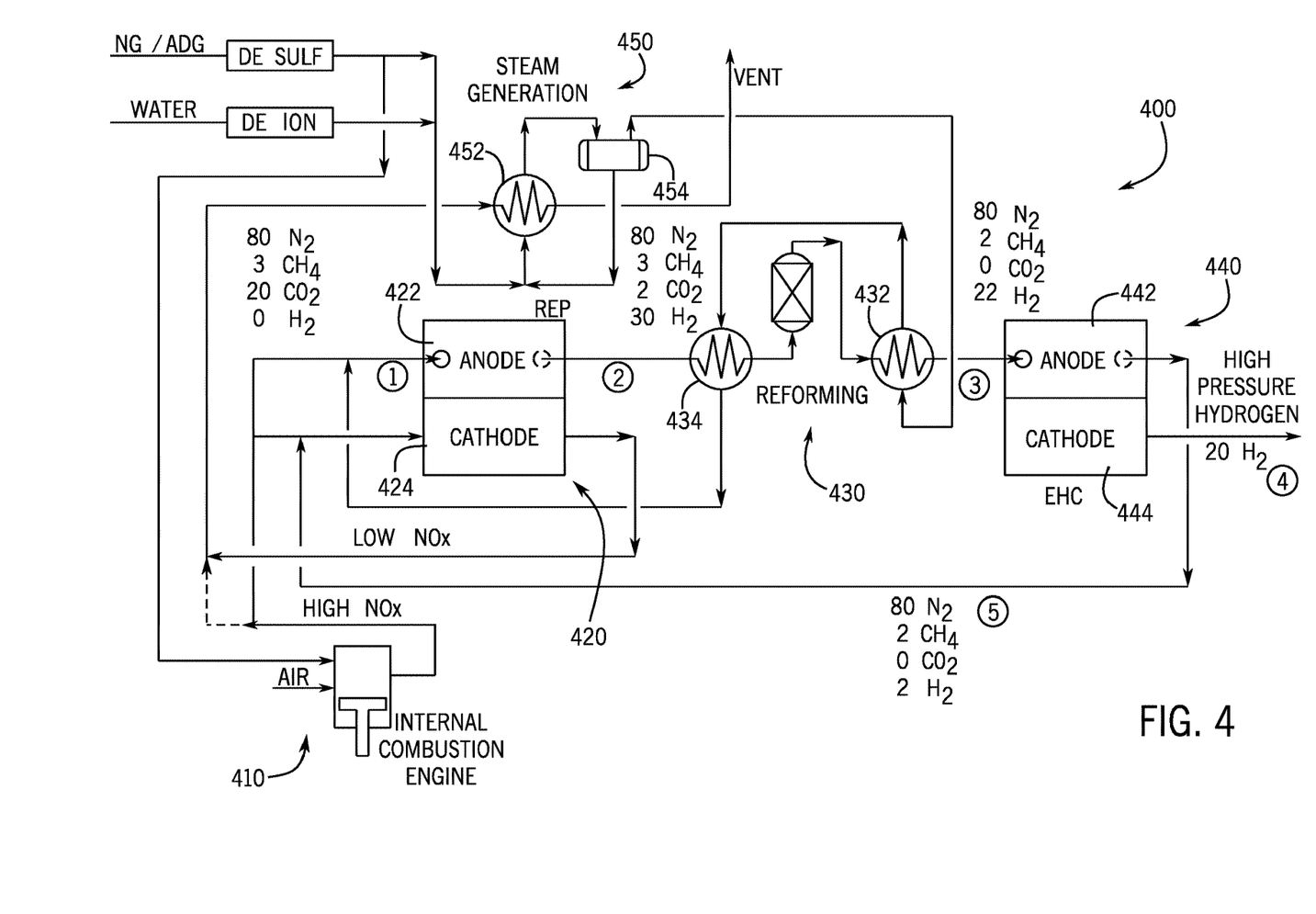
FIG. 4 shows a high-efficiency energy storage and NOx reduction system.

Referring to FIG. 4, an alternative energy storage system is provided for storing energy by converting water into hydrogen. Conventionally, water can be converted to hydrogen and oxygen by electrolysis to store excess power from wind and solar power. However, low temperature water electrolysis has a low round trip efficiency due to low efficiency of the electrolyzer. Lower efficiency reduces the cost effectiveness of existing technologies and applications of electrolysis for energy storage.

Certain embodiments of the present invention overcome these difficulties by using an energy storage system 400 to generate hydrogen from water or steam. A REP assembly requires steam and $CO_2$, so the REP assembly may be used in conjunction with a power plant to supply exhaust, which includes $CO_2$, and supply heat to keep the energy storage system 400 in heat balance. The power plant may be a steam boiler, a combustion turbine, or an internal combustion engine ("ICE") 410.

The energy storage system 400 includes an ICE 410, a REP assembly 420, a reformer 430, and an electrochemical hydrogen compressor ("EHC") 440.

In FIG. 4, fuel is provided and fed into the ICE 410 along with air for combustion. Generally, fuel cells are intolerant to sulfur, so the fuel may first be desulfurized. Preferably, the fuel is natural gas, ADG, or other suitable fuel that has minimum or no sulfur. Combustion of the fuel in the ICE generates exhaust. In an exemplary embodiment, the exhaust may be further desulfurized. The exhaust includes mainly $CO_2$ and $N_2$. Specifically, the exhaust may contain about 80% $N_2$. The ICE may be configured to operate continuously, but when no excess power needs to be stored, the heat from the exhaust may be fed only to the REP cathode 424 to maintain the REP assembly 420 at its normal operating temperature.

Water is deionized and then fed into a steam generator 450. Heat from the exhaust or the output gas from the REP cathode 424 may be used to convert deionized water fed into the steam generator 450 into steam.

As shown in FIG. 4, the REP anode 422 receives exhaust, which includes about 80% $N_2$ and about 20% $CO_2$. According to an exemplary embodiment, a gas with a reducing atmosphere may be fed to the REP anode 422, such that a small amount of $CH_4$, $H_2$, or other hydrocarbon may be added to the exhaust gas to react with and remove any $O_2$ in the exhaust. Furthermore, the ICE 410 may be operating in a fuel-rich condition (i.e., with a low oxygen content), to minimize the $O_2$ content in the exhaust from the ICE 410. The $CO_2$ and $N_2$ along with the steam ($H_2O$), and $CH_4$ from a feedstock, react during electrolysis to produce an output gas containing mainly $H_2$ and $N_2$, with a small amount of $CO_2$, $CH_4$, and CO. The REP anode 422 may also receive fuel directly from the feedstock. The feed rate of $CO_2$ supplied by the exhaust to the REP anode 422 is controlled based on the amount of current (excess power available in the energy storage system 400) sent to the REP assembly 420. Preferably, the feed rate of $CO_2$ is controlled to minimize unreacted $CO_2$ in outlet gas from the REP anode 422.

The methane reforming reaction across the REP anode 422 is endothermic and removes heat from the system. Accordingly, the temperature and temperature profile of the REP assembly 420 can be controlled at least in part based on the amount of $CH_4$ fed into the system. Further, $H_2$ is a byproduct of the methane reforming reaction and $H_2$ output from the REP assembly 420 may be controlled at least in part by the amount of $CH_4$ fed into the REP assembly 420. According to an exemplary embodiment, the $H_2$ byproduct may be substantially proportional to the carbon input. For example, the $H_2$ byproduct may be substantially proportional to the amount of $CH_4$ and/or $CO_2$ fed into the REP assembly 420.

Exhaust is also fed into the REP cathode 424 to provide additional heat to the REP assembly 420. Where no energy needs to be stored, exhaust is fed exclusively to the REP cathode 424, and not the REP anode 422. The reaction in the REP assembly 420 further generates $CO_2$ and $O_2$ in the REP cathode 424.

A fuel and water mixture is heated in a steam heat exchanger 452 in the steam generator 450, wherein the water is converted to steam, resulting in a fuel and steam mixture. Heat is supplied to the steam heat exchanger 452 by the outlet gas from the REP cathode 424. In an exemplary embodiment, heat is also supplied in part by the exhaust from the ICE 410. The fuel and steam mixture output by the steam generator 450 is fed through a water drop out 454, wherein excess water that was not converted to steam is removed from the heated steam and fuel mixture. The excess water is fed back into the steam heat exchanger 452. The fuel and steam mixture is further heated in the first reformer heat exchanger 432, transferring heat from the reformer output gas mixture.

A second reformer heat exchanger 434 is used to pre-heat the fuel and steam mixture supplied to the REP assembly 420. The output gas from the REP anode 422 is cooled in the second reformer heat exchanger 434, transferring heat to the steam and fuel mixture before the fuel and steam mixture is fed into the REP anode 422.

In the EHC 440, a stream containing $H_2$ is electrochemically pushed across a membrane, resulting in a stream of purified $H_2$ under high pressure released from the EHC cathode 444. Specifically, converted hydrogen-containing gas from a reformer, comprising the mixture of $H_2$ and $CH_4$, and in this configuration nitrogen, is conveyed to a hydrogen pump, which uses electrochemical hydrogen compression to compress hydrogen. The $H_2$ and $CH_4$ mixture is received in the EHC anode 442, and $H_2$ is pumped across a membrane to the EHC cathode 444 so as to separate it from the methane and $N_2$. Pure compressed $H_2$ is output from the EHC cathode 444, while $CH_4$ and $N_2$ is separately output from the EHC anode 442. By using the hydrogen pump with the EHC 440, hydrogen can be purified to over 99% purity and output at high pressure of 2,000 psig or greater, suitable for storage or for use in devices that operate on high purity hydrogen. The remaining gas mixture includes $CH_4$, $N_2$, and any leftover $H_2$ that was not purified, and is fed back into the REP cathode 424.

The EHC 440 is generally intolerant of CO, so a reformer 430 may be employed to convert substantially all of the CO into $CH_4$ before the output gas from the REP anode 422 is fed to the EHC 440. The reaction in the reformer 430 also converts substantially all of the $CO_2$ into $CH_4$. During the reaction, $H_2$ is reacted with $CO_2$ and CO to form $CH_4$ and water by a methanation reaction (see equations (2) and (3)).

$$CO_2 + 4H_2 \rightarrow CH_4 + 2H_2O \qquad (2)$$

$$CO + 3H_2 \rightarrow CH_4 + H_2O \qquad (3)$$

Preferably, the reformer 430 outputs converted hydrogen-containing gas comprising a mixture of at least $H_2N_2$, $CH_4$. The reformer output gas mixture is further cooled in a first reformer heat exchanger 432 and fed into the EHC anode 442.

During electrolysis in the REP assembly 420, $CO_2$ and $O_2$ are added to the REP cathode 424. $H_2$ and $CH_4$ of the remaining gas mixture from the EHC 440 are then oxidized by the $CO_2$ and $O_2$ to produce $CO_2$ and $H_2O$. The oxidation process generates additional heat. The output gas from the REP cathode 424 is then fed through the steam heat exchanger 452 to provide heat for converting water to steam and is then vented out of the energy storage system 400. When an MCFC is operated to produce power, the amount of $NO_x$ fed to the system is typically reduced, so that when an MCFC is operated in REP mode, $NO_x$ fed to the REP system may still be reduced.

Generally, $H_2$ produced from $CO_2$ requires approximately 36 kWh/kg, whereas $H_2$ produced from $CH_4$ feedstock to the REP assembly 420 requires less than 8 kWh/kg. A $CH_4$ feedstock to a REP assembly 420 reduces the energy required to generate $H_2$ because in a $CH_4$-fed REP assembly 420, approximately 80% of $H_2$ is generated by reforming $CH_4$ in the reformer 430 and the remaining approximately 20% of $H_2$ is generated during electrolysis in the REP assembly 420.

Figure 5:
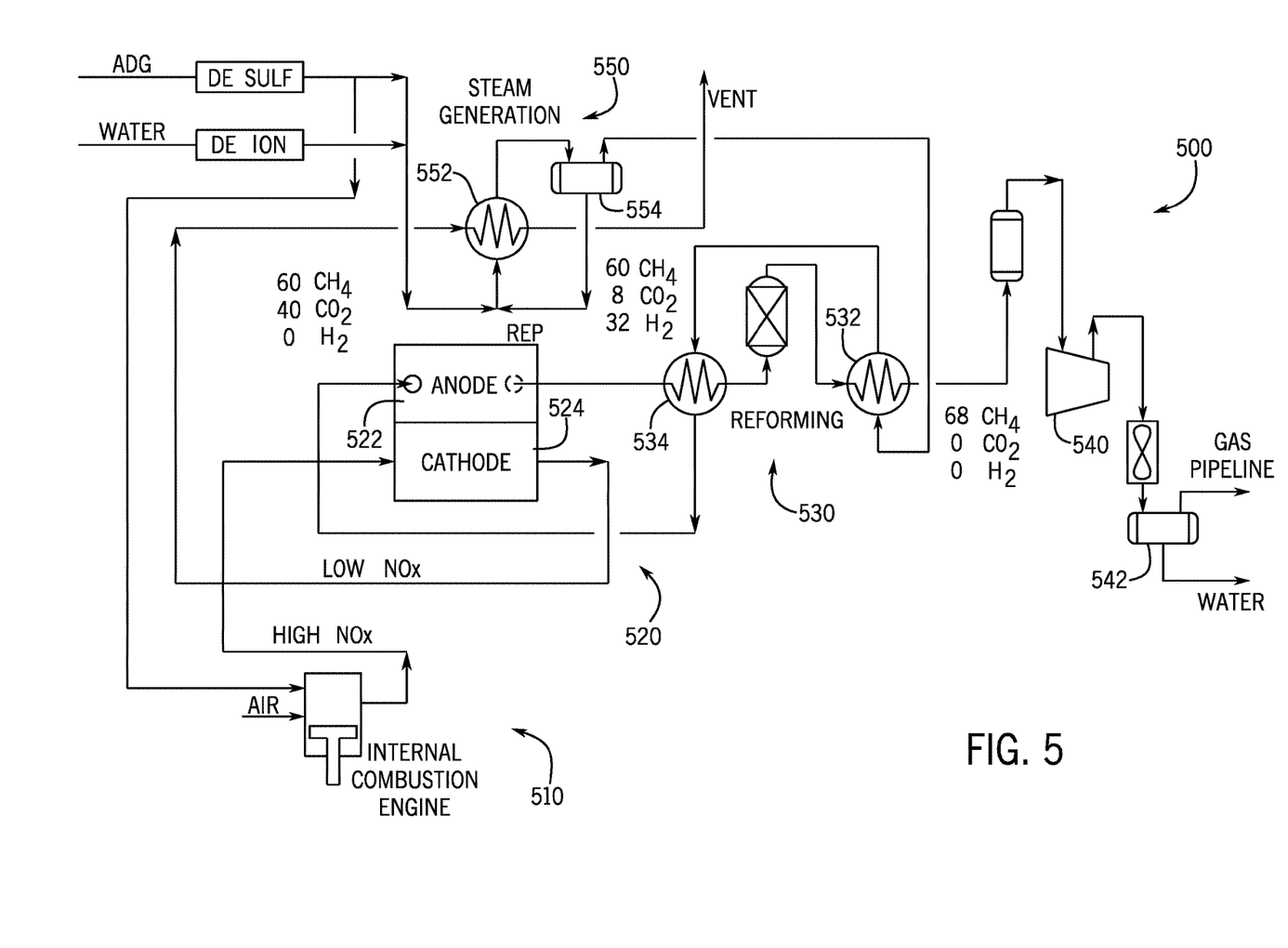
FIG. 5 shows a power-to-methane conversion system based on ADG feedstock.

Referring to FIG. 5, an energy storage system is provided for storing energy by converting a fuel with a higher $CO_2$ content, such as ADG, to another fuel with a lower $CO_2$ content, such as pipeline natural gas, by efficiently removing $CO_2$ from the first fuel. Conventionally, ADG is converted to natural gas by compressing ADG to high pressure and removing $CO_2$ using pressure swing adsorption ("PSA") systems, or by converting $CO_2$ to $CH_4$ by adding hydrogen.

The former technique results in removal of a portion of $CH_4$ with the $CO_2$, which must be flared to prevent $CH_4$ emissions and further has high compression costs since $CO_2$ as well as $CH_4$ must be compressed. The latter conventional technique requires expensive hydrogen and about 17% of the hydrogen energy is converted into heat rather than $CH_4$ due to the exothermic nature of the reaction.

Certain embodiments of the present invention overcome these difficulties by using an energy storage system 500 to convert ADG to natural gas by removing most of the $CO_2$ electrochemically in a REP assembly 520 and by removing the remaining $CO_2$ by a methanation reaction in a reformer 530, while using a power plant to supply heat to keep the energy storage system 500 in heat balance. The power plant may be a combustion turbine or an ICE 510 and may be configured to supply an REP cathode feed gas to a REP cathode 524. According to an exemplary embodiment, the REP cathode feed gas includes a hydrocarbon. The energy storage system 500 generates a supply of $CH_4$, which may be injected into a natural gas pipeline. Specifically, the energy storage system 500 may be advantageous for forming $CH_4$, where the fuel is ADG or other suitable fuel.

The energy storage system 500 includes an ICE 510, a REP assembly 520, and a reformer 530.

In FIG. 5, fuel containing $CO_2$ is desulfurized and fed into the ICE 510 along with air for combustion. Preferably the fuel is ADG, or other suitable fuel. According to an exemplary embodiment, the feed to the REP 520 may be substantially all $CO_2$. Combustion of the fuel in the ICE generates exhaust. The exhaust includes mainly $CO_2$ and $N_2$. Specifically, the exhaust may contain about 80% $N_2$. The exhaust is fed through the REP cathode 524, through a steam heat exchanger 552, and vented out of the energy storage system 500. According to an exemplary embodiment, the exhaust is the REP cathode feed gas. Most of the heat needed for the energy storage system 500 is generated by the methanation reaction, but the heat from the exhaust is used to assist in maintaining the REP assembly 520 at its normal operating temperature.

Water is deionized and then fed into a steam generator 550. Heat from the exhaust or the gas output from the REP cathode 524 may be used to convert deionized water fed into the steam generator 550 into steam. The fuel and water mixture is heated in the steam heat exchanger 552 in the steam generator 550, wherein the water is converted to steam, resulting in a fuel and steam mixture. Heat is supplied to the steam heat exchanger 552 by the outlet gas from the REP cathode 524. The fuel and steam mixture output by the steam generator 550 is fed through a first water knockout pot 554, where excess water that was not converted to steam is removed from the heated steam and fuel mixture. The excess water is fed back into the steam heat exchanger 552. The fuel and steam mixture is further heated in a first reformer heat exchanger 532, transferring heat from the reformer output gas mixture. Further cooling of the reformer outlet gas may be desirable, but this heat exchanger is not shown.

A second reformer heat exchanger 534 is used to preheat the fuel and steam mixture supplied to the REP assembly 520. Output gas from the REP anode 522 is cooled in the second reformer heat exchanger 534, transferring heat to the fuel and steam mixture before the steam and fuel mixture is fed into the REP anode 522.

As shown in FIG. 5, the REP anode 522 receives an REP anode feed gas. For example, the REP anode feed gas may include ADG, which includes about 60% $CH_4$ and about 40% $CO_2$, and steam ($H_2O$). In the REP assembly 520, $CO_2$ is then pumped out of the mixture and $H_2$ is added to the mixture until the $H_2$ to $CO_2$ ratio is 4:1. Approximately 80% of the $CO_2$ from the ADG is pumped out, while approximately 20% is left for methanation. This ratio allows for the gas to be methanated in the reformer 530 to form a substantially pure stream of $CH_4$, with only small amounts of unconverted $H_2$ and $CO_2$ (see equation (4)).

$$60CH_4 + 8CO_2 + 32H_2 \rightarrow 68CH_4 + 16H_2O \qquad (4)$$

The reformer output gas mixture is heated in the first reformer heat exchanger 532 and fed to a compressor 540. The water produced in reformer 530 is condensed and separated from the $CH_4$ at a second water knockout pot 542. The remaining $CH_4$ is then injected into a natural gas pipeline. According to an exemplary embodiment, by storing the $H_2$ byproduct produced by the electrolysis reaction as methane, a substantial savings in compressor costs and energy may be realized. For example $CH_4$ has a volume that is substantially ⅓ of an equivalent amount of energy stored as $H_2$. Furthermore, a lower purity $H_2$ output from the REP 520 reduces the voltage required (e.g., on the order of 10%) for operating the REP 520, thereby increasing power storage efficiencies.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in structures, values of parameters, mounting arrangements, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An energy storage system comprising:
   a power plant configured to generate an exhaust gas comprising carbon dioxide;
   a first fuel cell comprising:
     an anode and a cathode separated by an electrolyte matrix; and
     wherein the first fuel cell is configured to receive at least a portion of the exhaust gas from the power plant;
     wherein the anode is configured to receive carbon dioxide via the exhaust gas and to also receive methane from a separate feed; and
     wherein the anode is configured to output a hydrogen-containing gas mixture comprising hydrogen and carbon monoxide;
   a power supply configured to apply a reverse voltage to the first fuel cell to operate the first fuel cell in reverse as an electrolyzer;
   a reformer configured to methanate the hydrogen-containing gas mixture output from the anode of the first fuel cell to convert substantially all of the carbon monoxide in the hydrogen-containing gas mixture to methane, wherein the reformer is configured to output a gas mixture; and
   a second fuel cell operating in reverse as a hydrogen pump, the second fuel cell configured to separate hydrogen from the gas mixture output by the reformer.

2. The energy storage system according to claim 1, wherein the cathode of the first fuel cell is configured to receive the exhaust gas from the power plant.

3. The energy storage system according to claim 1, wherein the power plant is an internal combustion engine.

4. The energy storage system according to claim 1, wherein the feed comprises methane and carbon dioxide; and
   wherein an amount of hydrogen output by the second fuel cell is proportional to an amount of carbon supplied by the feed.

5. The energy storage system according to claim 1, wherein the cathode of the first fuel cell is configured to receive a gas mixture output from an anode of the second fuel cell.

6. The energy storage system according to claim 1, wherein the reformer is further configured to convert carbon dioxide that is included in the hydrogen-containing gas output by the first fuel cell to methane.

7. The energy storage system according to claim 1, wherein the second fuel cell is configured to compress hydrogen-containing gas using an electrochemical hydrogen compressor to output purified hydrogen gas.

8. An energy storage system comprising:
   a power plant configured to output an REP cathode feed gas;
   a fuel cell comprising:
     an anode and a cathode separated by an electrolyte matrix; and
     wherein the anode is configured to receive an REP anode feed gas comprising carbon dioxide; and
     wherein the fuel cell is configured to output a hydrogen-containing gas mixture comprising hydrogen and carbon dioxide;
   a power supply configured to apply a reverse voltage to the fuel cell to operate the fuel cell in reverse as an electrolyzer;
   a reformer configured to methanate the hydrogen-containing gas mixture output from the fuel cell, such that carbon dioxide is convened to methane, the reformer configured to output a converted hydrogen-containing gas mixture; and
   a compressor configured to compress the convened hydrogen-containing gas mixture from the reformer.

9. The energy storage system according to claim 8, wherein the REP anode feed gas further comprises a hydrocarbon.

10. The energy storage system according to claim 8, wherein the power plant is an internal combustion engine.

11. The energy storage system according to claim 8, wherein the REP cathode feed gas is exhaust gas from the power plant.

12. The energy storage system according to claim 8, wherein the reformer is configured to convert carbon monoxide and carbon dioxide in the hydrogen-containing gas mixture output by the fuel cell into methane.

13. The energy storage system according to claim 8, wherein the compressor is configured to compress methane in the converted hydrogen-containing gas mixture from the reformer.

14. The energy storage system according to claim 13, wherein compressed methane and the converted hydrogen-containing gas mixture from the compressor are cooled, such that water is condensed and separated from the converted hydrogen-containing gas mixture.

15. The energy storage systems according to claim 8, wherein methane produced in the energy storage system is configured to be inserted into a pipeline.

16. The energy storage system according to claim 15, further comprising a water knockout pot configured to remove condensed water from the methane output stream.

17. The energy storage system according to claim 15, wherein compressed methane output from the compressor is configured to be stored.

18. The energy storage system according to claim 8, wherein the power plant is configured to receive an anaerobic digester gas and a mixture of carbon dioxide and methane.

* * * * *

UNITED STATES PATENT AND TRADEMARK OFFICE
CERTIFICATE OF CORRECTION

PATENT NO. : 10,680,265 B2
APPLICATION NO. : 15/980305
DATED : June 9, 2020
INVENTOR(S) : Fred C. Jahnke and Matthew Lambrech Page 1 of 1

It is certified that error appears in the above-identified patent and that said Letters Patent is hereby corrected as shown below:

In the Claims

Claim 8, Column 14, Line 24:
Please delete:
"convened"
Please replace with:
"converted"

Claim 8, Column 14, Line 27:
Please delete:
"convened"
Please replace with:
"converted"

Signed and Sealed this
Twenty-second Day of September, 2020

Andrei Iancu
*Director of the United States Patent and Trademark Office*